United States Patent Office 3,356,713
Patented Dec. 5, 1967

3,356,713
p-PHENYLENE-DICARBAMATES
Sidney B. Richter, Chicago, Ill., assignor to Velsicol
Chemical Corporation, Chicago, Ill., a corporation
of Illinois
No Drawing. Filed Nov. 14, 1962, Ser. No. 237,753
8 Claims. (Cl. 260—479)

This invention relates to the production of new pesticidal compositions of matter. More specifically, this invention relates to compounds of the general formula

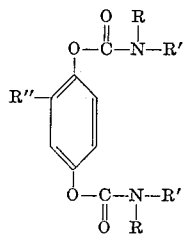

wherein R' and R" are lower unsubstituted alkyl and R is selected from the group consisting of hydrogen and lower unsubstituted alkyl. By lower alkyl is meant those groups containing up to six carbon atoms. The new compounds of this invention have been found to have valuable activity as pesticides, particularly as insecticides and miticides.

The new compounds of this invention can be prepared readily from the appropriate substituted hydroquinones

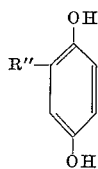

wherein R" is as defined above. Typical of such suitable starting materials are methylhydroquinone, ethylhydroquinone, propylhydroquinone, isopropylhydroquinone, butylhydroquinone, sec-butylhydroquinone, tert-butylhydroquinone, isopentylhydroquinone, and hexylhydroquinone.

The reaction to prepare the new compounds of this invention can be carried out with the hydroquinones and either the appropriate isocyanates R'NCO or the appropriate carbamoyl halides RR'NC(O)X, wherein X is halogen and R and R' are as defined above. When the isocyanates are used, compounds according to this invention will result in which R' is as defined and in which R is hydrogen. Typical of suitable isocyanates are compounds such as methyl isocyanate, ethyl isocyanate, isobutyl isocyanate, isopropyl isocyanate, tert-butyl isocyanate, hexyl isocyanate, cyclohexyl isocyanate, and the like. When the carbamoyl halides are used, compounds according to this invention will result in which R' is as defined and R is either hydrogen or lower alkyl, depending on the particular carbamoyl halide chosen. Carbamoyl chlorides are preferred for their ready availability and include such compounds as methylcarbamoyl chloride, ethylcarbamoyl chloride, butylcarbamoyl chloride, isobutylcarbamoyl chloride, sec-butylcarbamoyl chloride, dimethylcarbamoyl chloride, diethylcarbamoyl chloride, diisopropylcarbamoyl chloride, dibutylcarbamoyl chloride, dipentylcarbamoyl chloride, dicyclohexylcarbamoyl chloride, and the like. These carbamoyl chlorides are known in the art. Others which may be desired as starting materials can be prepared readily by the reaction of the appropriate amine with phosgene; thus the reaction of isopropylamine with phosgene will yield isopropylcarbamoyl chloride.

In carrying out the reaction with the substituted hydroquinone, at least two moles of the isocyanate or carbamoyl halide should be used for each mole of the hydroquinone; and in practice it is preferred to use an excess of the isocyanate or carbamoyl halide. The reaction can be carried out conveniently in an inert solvent such as benzene, toluene, or other aromatic solvents. The exact reaction temperature is not critical, but temperatures which are the normal reflux temperature of the reaction mixture are convenient. It is also advantageous to carry out the reaction in the presence of a catalytic amount of a substance such as pyridine when an isocyanate is used as one of the reactants. When a carbamoyl halide is used, such a substance as pyridine can be used in larger amounts to act as an acid scavenger for the hydrogen halide evolved during the reaction.

While the reaction will often progress to a satisfactory state of completion in a few hours, several days may be required for some reactants. Atmospheric pressure is ordinarily used for the reaction, but sub- or superatmospheric pressures can also be employed.

When the reaction has been carried out with an isocyanate, the product can be isolated from the reaction mixture conveniently by stripping off the solvent under reduced pressure, although in some cases the product crystallizes from the reaction mixtures and can be filtered off. It can be purified most conveniently by recrystallization from a suitable solvent, although other techniques known to the art, such as fractional distillation or chromatography, can also be used. It is also desirable to wash the crude reaction product with an aqueous solution of a base such as sodium or potassium hydroxide to remove any unreacted substituted hydroquinone. When a carbamoyl halide has been used as one of the reactants, it is first necessary to filter off the pyridine halide which forms, whereafter the product can be worked up in a manner similar to that described for the isocyanate reaction product.

The manner in which the new compounds of this invention can be prepared is illustrated in the following examples. All temperatures are in degrees centigrade.

Example 1.—Preparation of methyl-p-phenylene
N,N'-dimethyldicarbamate

A mixture of methylhydroquinone (6.2 g.; 0.05 mole), 15 ml. of methyl isocyanate, 100 ml. benzene, and a few drops of pyridine was stirred and refluxed for 7 hrs. in a 250-ml. flask. A white solid separated after the first hour of refluxing. The mixture was allow to cool to room temperature overnight, after which the solvent was removed under reduced pressure. The residual solid was stirred with 150 ml. of 15% aqueous KOH solution, filtered, washed with water, and dried to give 8 g. (67% of theory) of methyl-p-phenylene N,N'-dimethyldicarbamate, M.P. 196–198°.

Analysis for $C_{11}H_{14}N_2O_4$: Theory: C, 55.45%; H, 5.92%; N, 11.76%. Found C, 56.17%; H, 6.37%; N, 11.82%.

*Example 2.—Preparation of tert-butyl-p-phenylene N,N'-dimethyldicarbamate*

A mixture of 10 g. tert-butylhydroquinone, 20 ml. methyl isocyanate, 100 ml. benzene, and a few drops of pyridine was stirred and refluxed for 14 hrs. The solvent was removed from the clear solution under reduced pressure; and the residue was stirred with 200 ml. of 10% aqueous NaOH for 0.5 hr., filtered and washed with three 25-ml. portions of water. The product (2.6 g.; 15% of theory) was obtained in the form of light pink crystals, M.P. 151–156°. Recrystallization from dilute ethanol gave crystals, M.P. 159–161.5°.

*Example 3.—Preparation of tert-butyl-p-phenylene N,N,N',N'-tetramethyldicarbamate*

A mixture of tert-butylhydroquinone (10.6 g.; 0.064 mole) in 75 ml. toluene in a 300-ml. flask was treated with pyridine (11.1 ml.; 0.141 mole) and then dimethylcarbamoyl chloride (20.6 g.; 0.192 mole). The mixture was stirred and refluxed for 3 days and then filtered. The filter cake was washed with 3 portions of toluene. The combined toluene solution and extracts were dried over magnesium sulfate, filtered, and stripped of solvent under reduced pressure. On standing overnight, the residue solidified to a black substance, which was treated for 1 hr. with 15% NaOH solution, filtered, washed with water, and dried in the air. The yellow product was recrystallized from cold benzene-pentane to give crystals, M.P. 113.5–136°. Since recrystallization again from the same solvent mixture did not improve the melting point of the product, it was recrystallized from methanol and air-dried to give 4.9 g. (25% of theory) of yellow crystals, M.P. 153–155.5°.

A wide variety of other new compounds within the scope of this invention can be prepared in a manner similar to that detailed in the above examples. In the following examples are given the reactants which can be used to prepare the indicated named compounds of this invention.

*Example 4*

Ethylhydroquinone+methyl isocyanate=ethyl-p-phenylene N,N'-dimethyldicarbamate.

*Example 5*

Ethylhydroquinone+ethyl isocyanate=ethyl-p-phenylene N,N'-diethyldicarbamate.

*Example 6*

Ethylhydroquinone+isopropyl isocyanate=ethyl - p - phenylene N,N'-diisopropyldicarbamate.

*Example 7*

Ethylhydroquinone+butylcarbamoyl chloride=ethyl-p-phenylene N,N'-dibutyldicarbamate.

*Example 8*

Ethylhydroquinone+dimethylcarbamoyl chloride=ethyl-p-phenylene N,N,N',N'-tetramethyldicarbamate.

*Example 9*

Ethylhydroquinone+diethylcarbamoyl chloride=ethyl-p-phenylene N,N,N',N'-tetraethyldicarbamate.

*Example 10*

Ethylhydroquinone+diisopropylcarbamoyl chloride=ethyl-p-phenylene N,N,N',N'-tetraisopropyldicarbamate.

*Example 11*

Methylhydroquinone+ethyl isocyanate=methyl - p - phenylene N,N'-diethyldicarbamate.

*Example 12*

Methylhydroquinone+isopropylcarbamoyl chloride=methyl-p-phenylene N,N'-diisopropyldicarbamate.

*Example 13*

Methylhydroquinone+sec-butylcarbamoyl chloride=methyl-p-phenylene N,N'-di-sec-butyldicarbamate.

*Example 14*

Methylhydroquinone+dimethylcarbamoyl chloride=methyl-p-phenylene N,N,N',N'-tetramethyldicarbamate.

*Example 15*

Methylhydroquinone+diethylcarbamoyl chloride=methyl-p-phenylene N,N,N',N'-tetraethylcarbamoyl chloride.

*Example 16*

Isopropylhydroquinone+methyl isocyanate=isopropyl-p-phenylene N,N'-dimethyldicarbamate.

*Example 17*

Isopropylhydroquinone+ethyl isocyanate=isopropyl-p-phenylene N,N'-diethyldicarbamate.

*Example 18*

Isopropylhydroquinone+isopropylcarbamoyl chloride=isopropyl - p - phenylene N,N'-diisopropyldicarbamate.

*Example 19*

Isopropylhydroquinone+tert-butyl isocyanate=isopropyl-p-phenylene N,N'-di-tert-butyldicarbamate.

*Example 20*

Isopropylhydroquinone+dimethylcarbamoyl chloride=isopropyl-p-phenylene N,N,N',N'-tetramethyldicarbamate.

*Example 21*

Isopropylhydroquinone+diethylcarbamoyl chloride=isopropyl-p-phenylene N,N,N',N'-tetraethyldicarbamate.

*Example 22*

Isopropylhyroquinone+diisopropylcarbamoyl chloride=isopropyl-p-phenylene N,N,N',N'-tetraisopropyldicarbamate.

*Example 23*

Tert-butylhydroquinone+ethyl isocyanate=tert-butyl-p-phenylene N,N'-diethyldicarbamate.

*Example 24*

Tert-butylhydroquinone+isopropylcarbamoyl chloride=tert-butyl-p-phenylene N,N'-diisopropyldicarbamate.

*Example 25*

Tert-butylhydroquinone+butylcarbamoyl chloride=tert-butyl-p-phenylene N,N'-dibutyldicarbamate.

*Example 26*

Tert-butylhydroquinone+dimethylcarbamoyl chloride=tert-butyl-p-phenylene N,N,N',N'-tetramethyldicarbamate.

*Example 27*

Tert-butylhydroquinone+diethylcarbamoyl chloride=tert-butyl-p-phenylene N,N,N',N'-tetraethyldicarbamate.

*Example 28*

Tert-butylhydroquinone+diisopropylcarbamoyl chloride=tert-butyl-p-phenylene N,N,N',N'-tetraisopropyldicarbamate.

*Example 29*

Isopentylhydroquinone+methyl isocyanate=isopentyl-p-phenylene N,N'-dimethyldicarbamate.

*Example 30*

Hexylhydroquinone+ethyl isocyanate=hexyl-p-phenylene N,N'-diethyldicarbamate.

For practical use as insecticides and miticides, the compounds of this invention are generally incorporated into insecticidal and miticidal compositions which comprise an inert carrier and an insecticidally and miticidally toxic amount of such a compound. The compositions will often comprise a major amount of inert carrier. Such compositions, which can also be called formulations, enable the active compound to be applied conveniently to the site of the insect or mite infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the insect or mite infestation. The emulsifiers most commonly used in these concentrates are nonionic or mixtures of nonionic with anionic surface-active agents.

A typical composition according to this invention is illustrated by the following example, in which the quantities are in parts by weight.

*Example 31.—Preparation of a dust*

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the insect or mite infestation.

The insecticides and miticides of this invention can be applied in any manner recognized by the art. The concentration of the new compounds of this invention in the composition will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention can be used in many ways for the control of insects and mites by means of the method of this invention, which comprises contacting the insects and mites with an insecticidal and miticidal composition which comprises an inert carrier and as the essential active ingredient, in a quantity which is toxic to the insects and mites, a compound of this invention. Compositions which are to be used as stomach poisons or protective materials can be applied to the surface on which the pests feed or travel. Compositions which are to be used as contact poisons or eradicants can be applied directly to the body of the pest, as a residual treatment to the surface on which the pest may walk or crawl, or as a fumigant treatment of the air which the pest breathes. In some cases, the compounds applied to the soil or plant surfaces are taken up by the plant, and the pests are poisoned systemically.

The above methods of using insecticides and miticides are based on the fact that almost all the injury done by these pests is a direct or indirect result of their attempts to secure food. Indeed, the large number of such destructive pects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy moth. There are also the piercing-sucking insects, such as the pea aphid, the house fly, the chinch bug, leafhoppers, and plant bugs.

Another groups of insects comprises the internal feeders. These include borers such as the European corn borer and the corn earworm; worms or weevils such as the codling moth, cotton boll weevil, plum curculio, melonworm, and the apple maggot; leaf miners such as the apple leaf miner and the beet leaf miner; and gall insects such as the wheat jointworm and grape phylloxea. Insects which attack below the surface of the ground are classified as subterranean insects and include such destructure pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides, while those useful for the control of both mites and ticks are known specifically as acaricides.

The quantity of active compound of this invention to be used for insect or mite control will depend on a variety of factors, such as the specific species involved, intensity of the infestation, weather, type of environment, type of formulation, and the like. For example, the application of only one or two ounces of active chemical per acre may be adequate for control of a light infestation of an insect or mite under conditions unfavorable for its feeding, while a pound or more of active compound per acre may be required for the control of a heavy infestation of insects or mites under conditions favorable to their development.

The toxicity of the compounds of this invention to insects and mites can be shown by a variety of testing techniques shown to the art. For example, in one series of tests fifty adults of the Chemical Specialties Manufacturers' Association strain of house flies were placed in a stainless steel cage and sprayed with a test compound formulated as an aqueous emulsion. The flies were retained in the cage for determination of mortality after 24 hours. In these tests, the compound methyl-p-phenylene N,N'-dimethyldicarbamate at a concentration of 0.35% caused 82% mortality of the flies while the compound tert-butyl-p-phenylene N,N'-dimethyldicarbamate at a concentration of 0.1% caused 100% mortality of the flies.

In a test for systemic activity on the pea aphid, 20 ml. of a 0.01% emulsion of methyl-p-phenylene N,N'-dimethyldicarbamate was applied to the vermiculite substratum of potted pea plants. Forty-eight hours after application, the plants were infested with 10 adult pea aphids. After 5 days, all the aphids were dead in this test, whereas all the aphids were alive in an untreated control.

In another test, lima bean leaves were sprayed on the dorsal and ventral surfaces with a 0.1% emulsion of tert-butyl-p-phenylene N,N'-dimethyldicarbamate and offered to late second instar of the Mexican bean beetle for a 48-hr. feeding period. The feeding rate and mortality were then determined; and it was found that the compound under test gave 100% mortality with only trace feeding, while there was large feeding and no mortality in an untreated control.

Lima bean plants were also infested with 50 to 100 adults of the strawberry spider mite (*Tetranychus atlan-* ticus) and dipped into a test emulsion of 0.1% tert-butyl-p-phenylene N,N'-dimethyldicarbamate. After 5 days, there was 100% mortality of the mites on the treated plants but no mortality on untreated plants.

What is claimed is:
1. A compound of the formula

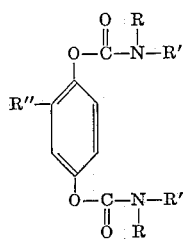

wherein R' and R'' are lower alkyl and R is selected from the group consisting of hydrogen and lower alkyl.
2. A compound as described in claim 1, wherein R' and R'' are lower alkyl and R is hydrogen.
3. A compound as described in claim 1, wherein R, R' and R'' are lower alkyl.
4. Methyl-p-phenylene N,N'-dimethyldicarbamate.
5. Tert-butyl-p-phenylene N,N'-dimethyldicarbamate.
6. Tert-butyl-p-phenylene N,N,N',N'-tetramethyldicarbamate.
7. Isopropyl-p-phenylene N,N'-dimethyldicarbamate.
8. Ethyl-p-phenylene N,N'-dimethyldicarbamate.

References Cited
UNITED STATES PATENTS

| | | | |
|---|---|---|---|
| 2,777,871 | 1/1957 | Strain | 260—479 |
| 2,992,966 | 7/1961 | Jacobi et al. | 167—30 |
| 3,098,001 | 7/1963 | Werres et al. | 167—30 |
| 3,110,726 | 11/1963 | Moore et al. | 260—479 |
| 3,111,539 | 11/1963 | Bocker et al. | 260—479 |

OTHER REFERENCES

Cornman: National Cancer Institute Journal, vol. 10, pp. 1123–1138 (1950).

Kolbezen et al.: Journal of Agriculture & Food Chemistry, vol. 2, pp. 864–870 (1954).

Casida et al.: Journal of Economic Entomology, vol. 53, pp. 205–212 (1960).

LORRAINE A. WEINBERGER, *Primary Examiner.*

JULIAN S. LEVITT, RICHARD K. JACKSON,
*Examiners.*

R. L. HUFF, I. R. PELLMAN, K. ROSE, M. B. WEBSTER, *Assistant Examiners.*

UNITED STATES PATENT OFFICE
CERTIFICATE OF CORRECTION

Patent No. 3,356,713                       December 5, 1967

Sidney B. Richter

It is hereby certified that error appears in the above numbered patent requiring correction and that the said Letters Patent should read as corrected below.

Column 3, line 9, for "15%" read -- 15.5% --; column 6, line 7, for "pects" read -- pests --; line 20, for "phylloxea" read -- phylloxera --; line 23, for "structure" read -- structive --; same column 6, line 46, for "shown" read -- known --.

Signed and sealed this 4th day of March 1969.

(SEAL)
Attest:

Edward M. Fletcher, Jr.                     EDWARD J. BRENNER
Attesting Officer                            Commissioner of Patents